J. V. ROYAL.
PROTECTIVE ARMOR FOR PNEUMATIC TIRES.
APPLICATION FILED APR. 4, 1917.
1,266,054.
Patented May 14, 1918.
2 SHEETS—SHEET 1.
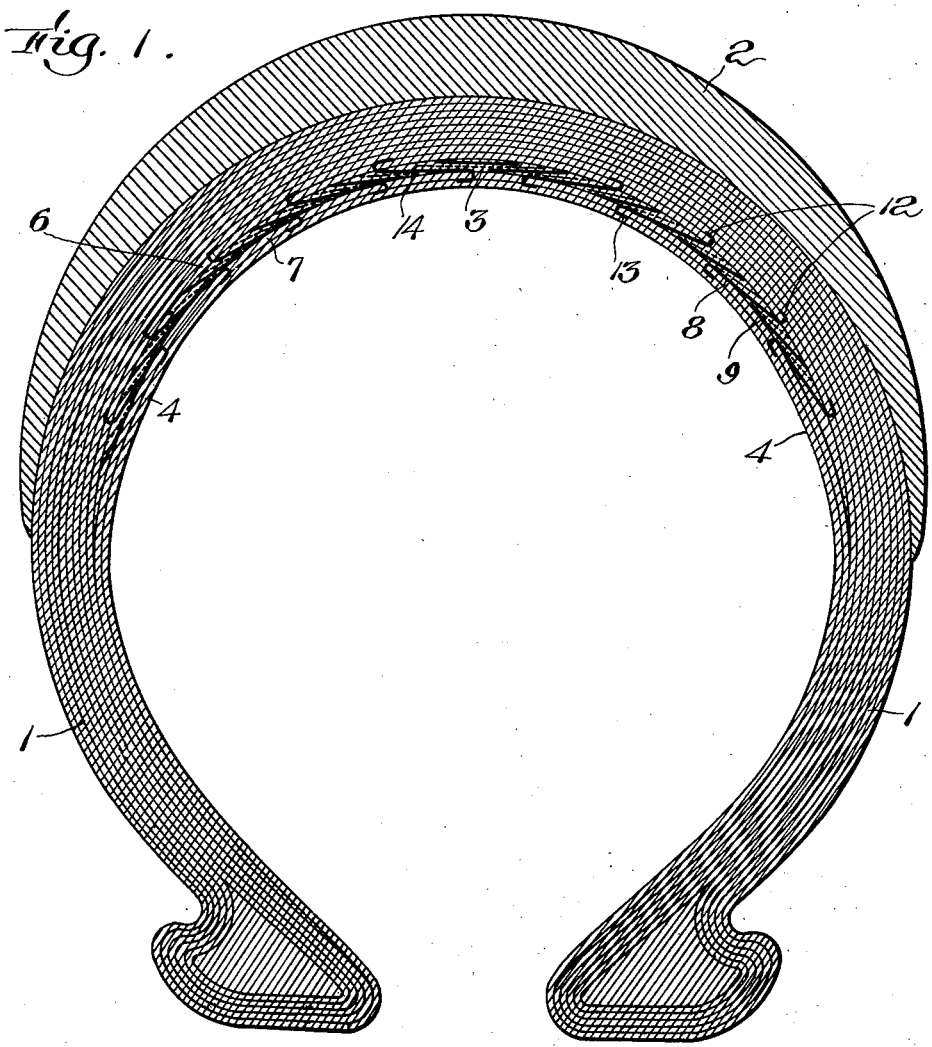
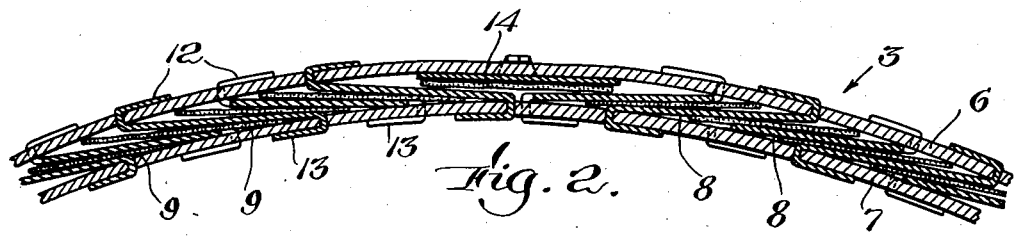
Inventor:
James V. Royal,
by Roberts Roberts Cushman
Attorneys J. V. ROYAL.
PROTECTIVE ARMOR FOR PNEUMATIC TIRES.
APPLICATION FILED APR. 4, 1917.

1,266,054.

Patented May 14, 1918.
2 SHEETS—SHEET 2.

Inventor:
James V. Royal,
by Rohrte Rohrte Cushman
Attorneys

UNITED STATES PATENT OFFICE.

JAMES V. ROYAL, OF WOLLASTON, MASSACHUSETTS, ASSIGNOR OF ONE-HALF TO JOHN L. LAYNE, OF BOSTON, MASSACHUSETTS.

PROTECTIVE ARMOR FOR PNEUMATIC TIRES.

1,266,054.    Specification of Letters Patent.    Patented May 14, 1918.

Application filed April 4, 1917. Serial No. 159,758.

*To all whom it may concern:*

Be it known that I, JAMES V. ROYAL, a citizen of the United States, and resident of Wollaston, in the county of Norfolk and State of Massachusetts, have invented new and useful Improvements in Protective Armor for Pneumatic Tires, of which the following is a specification.

This invention relates to pneumatic tires and more particularly to a protective armor for pneumatic tires and the like.

It has been proposed to employ a plurality of metal disks or other hard members arranged in juxtaposition to protect tires from puncture, but the protective members have been employed in various combinations and relations different from those which I have conceived and which I believe to be superior. For example, it has been proposed to mount the disks in the body portion of the outer casing and in the solid tread commonly surrounding the outer casing of pneumatic tires. Moreover, it has been proposed to mount the disks in the tire in overlapping relationship so that the entire surface of the tire may be protected. The use of metallic members within the body portion of the outer casing or tread has led to difficulties in manufacture as well as difficulties in use, the tires so equipped being quickly destroyed by the action of the members in the tread or casing. In overlapping the disks or armor members of different contour the members have been arranged in rows longitudinally of the periphery of the tire and the rows have usually been arranged in overlapping relationship, each row being disposed either beneath or above the adjacent rows. This arrangement has been unsatisfactory, particularly for the reason that a nail or other sharp projection penetrating the tire to the layer of armor is quite likely to pry up a member disposed in the outer layer and thus pass between the overlapped layers. This and other difficulties I have successfully overcome by the present invention.

The principal objects of the invention are to provide a tire which is adequately proof against puncture and which is at the same time easy to construct, flexible and exceedingly durable. Other objects of the invention are to provide a protective armor in such relationship to the inner and outer tubes of the tire that maximum protection of the inner tube is afforded and such that maximum flexibility and resiliency of the tire is obtained.

Still further objects of the invention will be apparent from the following description taken with the accompanying drawings, in which—

Figure 1 is a transverse section through a tire showing my protective armor in the preferred position;

Fig. 2 is a transverse sectional view of the preferred form of the protective armor;

Figure 3:
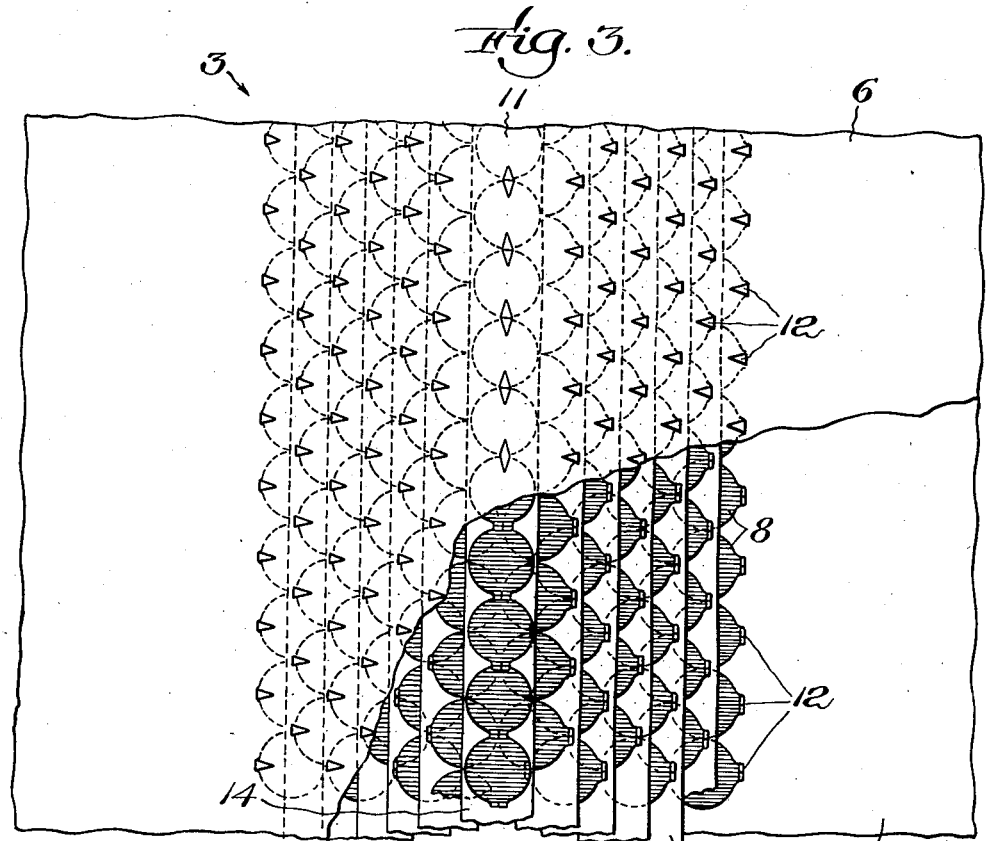
Fig. 3 is a plan view of the outer surface of the protective armor, a portion of the outer covering being cut away.
Figure 4:
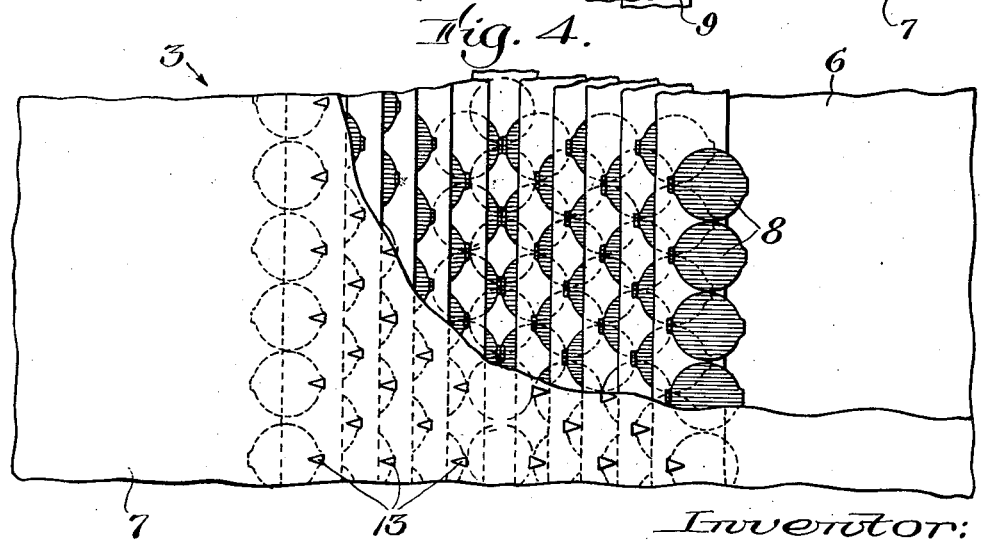
Fig. 4 is a plan view of the under surface of the protective casing, a portion of the under covering being cut away.

The particular embodiment of my invention illustrated in the drawings comprises an outer casing 1 of any ordinary or suitable construction, a tread 2 mounted on the outer periphery of the outer casing, and my improved protective armor 3. As illustrated in Fig. 1, the protective armor is preferably disposed at the inner surface of the outer casing 1 instead of being embedded in the central portion of the casing or in the tread. In the preferred construction the armor is built as a part of the outer casing forming the innermost portion of the casing, a layer 4 of canvas or other suitable material being placed over the armor to protect the inner tube from the metallic parts of the armor, although it is to be understood that the protective armor may be formed separately and be disposed between any ordinary outer casing and the inner tube.

The preferred embodiment of the protective armor, as illustrated in the figures, comprises an outer sheet 6 of canvas or other suitable material, an inner sheet 7 of similar material, a plurality of members 8 of metal, hard rubber or other relatively hard protective material, and a plurality of strips 9 of rubberized tape or other suitable material disposed between the overlapping portions of the protective members 8. The members 8 are preferably arranged in rows longitudinally of the periphery of the tire with each succeeding row on either side of the central row 11 overlapping the next succeeding outer row, the members of the respective rows being disposed in staggered relationship with respect to the members of next adjacent rows and preferably being placed end to end instead of being overlapped with respect to each other. The respective members 8 are provided with upturned pointed lips 12 at their outer edges and with similar downturned lips 13 at their inner edges, the outer lips passing upwardly through the inner sheet 6 and preferably being folded inwardly, and the inner lips passing through the outer sheet 7 and preferably being folded outwardly. In this way the members 8 are not only held securely in position but they also function to secure together the inner and outer sheets 6 and 7 of the fabric. The lips on each of the members in the central row 11 are both bent upwardly so as to pass through the inner sheet 6 and are then folded either inwardly or outwardly, but preferably inwardly as shown in Fig. 3. The lips of the members in the central row are also preferably disposed in a longitudinal line rather than in transverse lines as are the lips on the members in the other rows.

In order to prevent undue friction and consequent heating of the members 8, separating strips are preferably disposed between the overlapping portions of the respective rows of these members. These strips preferably consist of tape impregnated with rubber or a rubber compound or rubber substitute, but the tape may, if desired, be employed with satisfactory results in untreated form. The strips of tape are preferably of approximately the same width as the transverse dimension of the members 8 so that they extend inwardly and outwardly somewhat beyond the overlapping portions of the rows of protective members. Inasmuch as the central row 11 overlaps both of the adjacent rows the strip of tape 14 disposed between the central row and the adjacent rows extends substantially the full width of the central row of members.

By virtue of the fact that each of the rows of members 8 overlaps the succeeding outer row, a nail or other sharp projection penetrating the tire to the protective armor will there be stopped by the protective member first engaged, or if it slides off the first member it will engage the member of the succeeding outer row and either be stopped thereby or caused to slide off onto the next succeeding member, whereas if alternate rows overlapped the adjacent row on either side as has been proposed, a projection deflected from a member in one of the inner or lower rows would pass between the member of that row and the adjacent member of the next outer and upper row so as to pass between the rows and thereby reach the inner tube.

Another important feature of the invention resides in the unique method of attaching the protective members 8 to the upper and lower sheets 6 and 7 whereby the sheets are bound together by the members. Moreover, the row of upturned lips on one row of members 8 and the row of downturned lips on the next succeeding inner row of members 8 form a channel therebetween for the tape 9 so that the tape is confined to its proper longitudinal position, it being allowed to move laterally only a small distance, if at all. Owing to the attachment of the protective members to the supporting sheet or sheets at their inner or outer or both inner and outer edges the members may be overlapped to any desired extent, whereas when the members are mounted at their central portions they can be overlapped at most only somewhat less than half way.

Another important feature of the invention resides in the arrangement of the members 8 in each of the respective rows. Heretofore it has been proposed to overlap the respective members of each row longitudinally of the periphery of the tire as well as to overlap the respective rows transversely of the tire. This has led to undue friction and stiffening of the tire inasmuch as the wave of depression produced in the tire by contact with the roadway which causes the respective members to tilt with respect to each other about transverse axes has caused the edges of the members to unduly rub against the overlapping portions of adjacent members, and inasmuch as the members overlapped longitudinally of the periphery of the tire, the tire was unduly stiffened in this direction, thereby adding to the friction produced by the aforesaid wave of depression. With the arrangement which I have provided, wherein the members of each row are placed end to end longitudinally of the tire, the aforesaid difficulties are avoided inasmuch as the members have comparatively free movement about transverse axes passing between the adjacent members of each row. By virtue of this unique arrangement of the protective members objectionable heating and wear is avoided, especially when employing the friction preventing strips 9, and a protective armor is provided sufficiently flexible to meet the ordinary and also the extraordinary conditions of road service which may be expected.

I claim:

1. A pneumatic tire of the double tube type comprising an inner air tube, an outer casing, and a protecting armor disposed on the inner surface of the outer casing, the protecting armor comprising a plurality of relatively hard members and two sheets of supporting material, the said members being mounted between the two sheets in longitudinal overlapping rows, each row overlapping the next outer row, and the members being attached to each of the sheets.

2. A protective armor comprising a plurality of relatively hard members, two superposed sheets of flexible material for supporting the members, the members being disposed between the sheets in successive overlapping rows, each row overlapping the succeeding row in one direction, means for securing the members to the upper sheet at the edges directed in the said direction, and means for securing the members to the lower sheet at the edges directed in the opposite direction.

3. A protective armor comprising a plurality of relatively hard members, two superposed sheets of flexible material for supporting the members, the members being disposed between the sheets in successive overlapping rows, each row overlapping at least half of the succeeding row in one direction, means for securing the members to the upper sheet at the edges directed in the said direction, and means for securing the members to the lower sheet at the edges directed in the opposite direction.

4. A protective armor comprising a plurality of relatively hard members, two superposed sheets of flexible material for supporting the members, the members being disposed between the sheets in successive overlapping rows, each row overlapping the succeeding row in one direction, projections at the edges of the members directed in the said direction, the projections passing through the upper sheet and folding over, and projections at the edges of the member directed in the opposite direction, the latter projections passing through the lower sheet and folding over.

5. A protective armor comprising a plurality of relatively hard members disposed end-to-end in rows, each row overlapping the next succeeding row in one direction, and strips of friction preventing material disposed longitudinally of the rows between the respective overlapping portions of the rows, whereby the members are completely separated from each other by friction-preventing material.

6. A protective armor comprising two sheets of supporting material, a series of overlapping rows of relatively hard members, each row overlapping the succeeding row in one direction, means securing the members to one of said sheets at the edges directed in said direction, means securing the members to the other of said sheets at the edges directed in the opposite direction, and strips of friction-preventing material disposed longitudinally of the rows in the separate channels formed by the overlapping rows and the oppositely directed mounting means of adjacent rows.

7. A protective armor comprising a series of overlapping rows of relatively hard members, each row overlapping the succeeding row in one direction, sheets of flexible material on opposite sides of the said members, integral lips at the edges of said members directed in said direction, the lips passing through the upper sheet and folding over, other integral lips at the opposite edges of said members, the latter lips passing through the lower sheet and folding over, and strips of friction preventing material disposed longitudinally of said rows between the overlapping portions of the rows and between the upturned lips of one row of members and the downturned lips of the succeeding row of members.

8. A device for armoring pneumatic tires and the like comprising a flat member having an upturned lip at one side and having a downturned lip at the opposite side.

9. A device for armoring pneumatic tires and the like comprising a metallic disk having an upturned pointed lip at one side and having a downturned pointed lip at the opposite side.

Signed by me at Boston, Massachusetts, this 27th day of March, 1917.

JAMES V. ROYAL.